United States Patent [19]

Jong

[11] Patent Number: 4,655,837

[45] Date of Patent: Apr. 7, 1987

[54] BUILDING MATERIAL AND MANUFACTURE THEREOF

[76] Inventor: Slosson B. Jong, 20722 Hunter La., Huntington Beach, Calif. 92646

[21] Appl. No.: 727,794

[22] Filed: Apr. 26, 1985

[51] Int. Cl.$^4$ .......................... C04B 35/16; C09D 1/02
[52] U.S. Cl. ........................... 106/76; 106/89; 106/77; 106/97
[58] Field of Search ............... 106/97, 314, 87, 75, 106/76, 84, 86, 89, 77, 74

[56] References Cited

U.S. PATENT DOCUMENTS

| | | | |
|---|---|---|---|
| 1,863,900 | 6/1932 | Nelson | 118/213 |
| 2,534,915 | 12/1950 | King, Jr. | 106/87 |
| 2,793,129 | 5/1957 | Klein | 106/90 |
| 2,827,385 | 3/1958 | Lyons | 106/90 |
| 3,141,857 | 7/1964 | Sommer | 521/83 |
| 3,661,829 | 5/1972 | Aignesherger et al. | 524/6 |
| 3,864,141 | 2/1975 | Uchikawa et al. | 106/90 |
| 3,972,723 | 8/1976 | Balle et al. | 106/90 |
| 4,019,918 | 4/1977 | Wills, Jr. | 106/90 |
| 4,045,237 | 8/1977 | Gaines et al. | 106/89 |
| 4,174,230 | 11/1979 | Hashimoto et al. | 106/116 |
| 4,350,533 | 9/1982 | Galer et al. | 106/89 |
| 4,357,167 | 2/1982 | Kellet et al. | 106/97 |

FOREIGN PATENT DOCUMENTS 796215  1/1981  U.S.S.R. .................. 106/77

*Primary Examiner*—William R. Dixon, Jr.
*Assistant Examiner*—A. Knab
*Attorney, Agent, or Firm*—William P. Green

[57] ABSTRACT

A building material is produced by forming a moldable aqueous composition including intermixed portland cement, gypsum, sodium hydroxide, sodium silicate, water, particles of a metal or metals selected from the group consisting of aluminum and zinc, and preferably also sodium thiosulfate, shaping the composition to a desired configuration, and then drying it to a hardened porous condition.

19 Claims, No Drawings

BUILDING MATERIAL AND MANUFACTURE THEREOF

BACKGROUND OF THE INVENTION

This invention relates to an improved building material, and methods and compositions for producing the material.

Various attempts have been made in the past for producing cementitious building material having a strength similar to that of portland cement, and usually including portland cement as a basic ingredient, but with additives of different types included in the composition to give the resulting product a particular structural characteristic or characteristics different than ordinary cement. For example, U.S. Pat. No. 1,863,990 issued June 21, 1932, to William E. Nelson, discloses a composition in which a particular specified type of synthetic organic substance is added to a mixture including portland cement or gypsum in an attempt to render the ultimate product porous. Other materials which may be included in the composition are other types of cement, talc, ground silica, clay, ground limestone, lime, aluminum sulfate, calcium carbonate, and metallic powdered aluminum. U.S. Pat. No. 2,827,385 issued Mar. 18, 1958 to Frank H. Lyons shows a quick setting cement including calcium acrylate and portland cement, and which may also include sodium thiosulfate, ammonium persulfate, silex, calcium carbonate, barium carbonate, asbestine, gypsum, raw sienna, or ground slag. The major purpose of the composition of that patent was to provide a quick setting cement. U.S. Pat. No. 4,019,918 issued Apr. 26, 1977 to Milton Herman Wills, Jr. and U.S. Pat. No. 4,045,237 issued Aug. 30, 1977 to R. W. Gaines et. al. dislcose compositions including portland cement and gypsum, with the composition of the latter patent including a high alumina cement in combination with the portland cement and gypsum. U.S. Pat. No. 3,864,141 issued Feb. 4, 1975 to Uchikawa et. al. discloses a composition whose setting time is regulated by various additives, and which composition may include sodium silicate as one of several possible ingredients.

SUMMARY OF THE INVENTION

The present invention provides a building material which is characterized by a unique combination of high structural strength and relatively low weight or mass as compared with ordinary portland cement. In addition, the material may have very good sound and heat insulating properties, and may be produced at a cost as low as or lower then conventional building materials which have structural characteristics less desirable than the present product for many uses.

The light weight and insulating properties of the material are attained at least in part by utilizing a process which renders the product porous, leaving a multitude of voids distributed uniformly throughout the ultimate product which contain only air or another gas. At the same time, the solid material surrounding and containing these voids is integrated and adhered together very positively and effectively in a manner permanently maintaining the integrity of the building material under high load forces which may be encountered in use.

The building material of the invention may be shaped to any desired configuration, such as building block form, or as a wall panel, floor slab, reinforced beam, column, or other structural shape or form.

DESCRIPTION OF THE PREFERRED EMBODIMENTS OF THE INVENTION

A block or other element formed of the present material may be produced by first intermixing a number of ingredients in an aqueous mixture having a consistency appropriate for molding, then shaping the mixture to a desired configuration as by pouring into a form of that shape, and then drying the shaped product to a hardened form. The ingredients employed in the composition desirably include, and in most instances comprise essentially, the following:

Portland Cement
Gypsum
Sodium Hydroxide (NaOH)
Sodium Silicate Solution ($Na_2SiO_3NaSiO_2.9H_2O$)
Metal Particles selected from a group consisting of aluminum and zinc
Water
An acid Considering the ingredients of this composition other than water, the portland cement and gypsum together comprise a major portion of those ingredients. Desirably, the portland cement itself comprises at least about one half of the composition exclusive of the water. The term "Portland Cement" is of course utilized with its normal connotation, and refers to a mixture of substances consisting essentially or primarily of the following:

Tetra Calcium Aluminate ($4CaO.Al_2O_3.Fe_2O_3$)
TriCalcium Aluminate ($3CaO.Al_2O_3$)
TriCalcium Silicate ($3CaO.SiO_2$)
DiCalcium Silicate ($2CaO.SiO_2$)

The gypsum employed in the present composition may be either in hydrated form ($CaSO_4.2H_2O$) or partially or completely calcined or dehydrated form ($2CaSO_4.H_2O$-Plaster of Paris) or ($CaSO_4.H_2O$). The term Gypsum as utilized in this application is to be considered as including any of these forms of calcium sulfate. In most instances, gypsum in its hydrated form ($CaSO_4.2H_2O$) is preferred, with this ingredient functioning as a retardant for delaying the setting of the portland cement. The gypsum is preferably ground or otherwise reduced to finely divided or powdered form, to facilitate its intimate intermixture and reaction with the portland cement and other ingredients of the composition.

The sodium hydroxide (NaOH) also assists in retarding the setting of the portland cement. The functions served by the sodium silicate solution ($Na_2SiO_3NaSiO_2.9H_2O$) include those of emulsifying the composition to keep its components in suspension, and serving as an adhesive agent. The aluminum or zinc particles, preferably in pellet form, cause a vigorous reaction to take place in the composition, developing a substantial quantity of hydrogen gas which disseminates throughout the composition and results in the porous condition of the ultimate product. Other reactions taking place in the composition also produce hydrogen gas or other gases to enhance the porous condition.

The acidic ingredient of the composition acts to neutralize hydroxides in the composition and give it improved adhesive and preservative qualities. The acidic ingredient is preferably sodium thiosulfate, but may also be sulfuric acid or acetic acid.

The various ingredients of the composition may be intermixed in the following order. As a first step, the portland cement, in kiln dried powdered form, may be mixed in a tank with water, desirably being churned rapidly to a completely uniform consistency by a mechanical mixing device. The gypsum, in finely divided powdered form, is then added to the aqueous portland cement mixture, and intimately intermixed therewith by the mechanical mixing device. The sodium hydroxide, sodium silicate solution, aluminum and/or zinc particles, and sodium thiosulfate or other acidic ingredient may then be added sequentially, with continuous mixing producing a final composition which is uniform throughout its entire volume. The amount of water employed in the mixture is just great enough to render the final composition sufficiently plastic and moldable to assume a desired shape when poured into a mold or when otherwise shaped to that configuration.

When these various ingredients are combined and intermixed as discussed, a vigorous chemical reaction takes place producing large quantities of gases attaining the discussed porous condition of the ultimate product, and integrating and adhering together the various components of the ultimate product to produce the desired porous but strong building material.

It is believed that the chemical reactions which occur in the composition include those set forth and discussed below. In the first place, the calcium oxide of the portland cement reacts with water to produce calcium hydroxide by the reaction:

$$CaO + H_2O \rightleftharpoons Ca(OH)_2 \tag{1}$$

The gypsum and sodium hydroxide apparently react as follows:

$$CaSO_4 + 2H_2O + 2NaOH \rightarrow \downarrow Na_2SO_4 + Ca(OH)_2 + 2H_2 \tag{2}$$

While either aluminum or zinc particles, or both, may be employed as the metal particles in the composition, it is usually preferred that these particles be of aluminum. When the particles are aluminum, this finely divided elemental metal apparently reacts with the sodium silicate solution as follows:

$$4Al + 6Na_2SiO_3.6NaSiO_2.12H_2O \rightarrow \downarrow 6Na_2O.2Al_2O_3.12SiO_2 + 6NaOH + 9H_2 \uparrow \tag{3}$$

The sodium thiosulfate ($Na_2S_2O_3.5H_2O$) reacts with water to produce reaction products including sulfuric acid as follows:

$$2Na_2S_2O_3.5H_2O + 3H_2O \rightarrow 2NaHSO_3 + Na_2SO_4 + H_2SO_4 + 5H_2 \uparrow \tag{4}$$

This sulfuric acid reacts with sodium hydroxide and calcium hydroxide:

$$H_2SO_4 + 2NaOH \rightarrow \downarrow Na_2SO_4 + 2H_2O \tag{5}$$

$$H_2SO_4 + Ca(OH)_2 \rightarrow \downarrow CaSO_4 + 2H_2O \tag{6}$$

The solids produced by the above defined reactions precipitate out and remain intermixed with the other substances in the final composition to coact therewith in integrating the final concrete product and adhering its various elements rigidly together. The hydrogen gases produce a large number of spaces in the mixture unfilled by solids and distributed throughout the volume of the composition and ultimate product giving the product a uniform porosity to render the produced block or other product very light in weight and insulative with respect to both sound and heat. Most if not all of the hydrogen gas may escape completely from the product as it ingredients discussed above, other fillers, aggregate, or additives for achieving various purposes may be mixed into the composition before it is cured by drying. For example, porous pebbles, sawdust, pumice, sand or other light aggregate substances may be employed.

If zinc particles or pellets are employed in lieu of the aluminum particles, the reaction which then occurs between the zinc particles Portland Cement and sodium is believed to be as follows:

$$3NaOH + CAO.Al_2O_3.SiO_2 + 12H_2O \longrightarrow Ca(OH)_2 + 2Al(OH)_3 + Na_2SiO_3.9H_2O \tag{7}$$

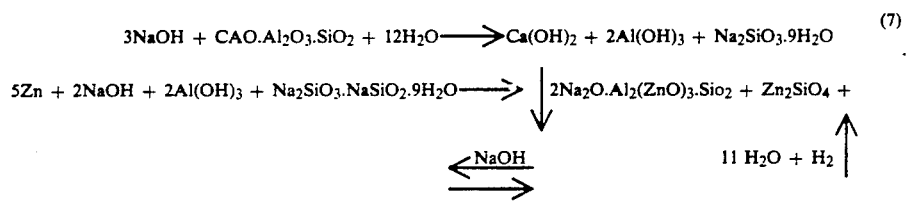

Thus, when aluminum particles are employed, the final product is characterized by the presence in the ultimate cured building material of the composition:

$$Na_2O.Al_2O_3.SiO_2 \tag{8}$$

And if zinc particles are used in the composition, the final building material is characterized by the presence of the following compound distributed throughout the material:

$$Na_2O.Al_2(ZnO)_3.SiO_2 \tag{9}$$

While the proportions of the different ingredients may vary over a wide range, it is preferred in most instances that the ingredients other than water be included in the composition in the following proportions by weight:

| | |
|---|---|
| Portland Cement | 70 to 94 parts |
| Gypsum | 10 to 30 parts |
| Sodium Hydroxide | 1 to 3 parts |
| Sodium Silicate Solution (saturated) | 150 to 275 parts |
| Aluminum and/or Zinc particles | ¼ to 1¼ parts |
| Sodium thiosulfate or other acidic component | 2 to 5 parts |

The water is present in an amount rendering the composition moldable, preferably between about 200 and 320 parts when the other ingredients are present in the above specified proportions.

EXAMPLE 1

The following ingredients were intermixed in the indicated proportions by weight:

| | |
|---|---|
| Portland Cement | 80 parts |

-continued

| | |
|---|---|
| Gypsum (CaSO$_4$.2H$_2$O) | 20 parts |
| Sodium Hydroxide | 2 parts |
| Sodium Silicate Solution (saturated) | 165 parts |
| Aluminum Particles | ¼ parts |
| Sodium Thiosulfate | 4 parts |
| Water | 246 parts |

The portland cement and water were first mixed together, with subsequent addition of the gypsum, sodium hydroxide, sodium silicate, aluminum and sodium thiosulfate in that order, while continuously churning the composition by a mechanical mixing device. A vigorous reaction took place, producing gases throughout the mixture. The composition was poured into a mold shaped as a building block and allowed to dry for four days. The block as removed from the mold after curing was porous, of high mechanical strength, insulative with respect to both sound and heat, and fire resistant.

EXAMPLE 2

The ingredients employed in Example 1 were utilized in a second composition, but with substitution of zinc particles for aluminum particles, with the proportions of the ingredients by weight being as follows:

| | |
|---|---|
| Portland Cement | 80 parts |
| Gypsum | 20 parts |
| Sodium Hydroxide | 5 parts |
| Sodium Silicate Solution (saturated) | 165 parts |
| Zinc Particles | 1 part |
| Sodium Thiosulfate | 5 parts |
| Water | 246 parts |

The ingredients of the composition were intermixed in the same order discussed in connection with Example 1, and the result after molding and curing was a high strength, rigid, porous, insulative, fire resistant building material.

While certain specific embodiments of the present invention have been disclosed as typical, the invention is of course not limited to these particular forms, but rather is applicable broadly to all such variations as fall within the scope of the appended claims.

I claim:

1. The method of producing a cement product that comprises:
forming a composition consisting essentially of the following ingredients in about the proportions set forth below, by weight, intermixed with water in an amount rendering the composition moldable:

| | |
|---|---|
| Portland Cement | 70 to 94 parts |
| Gypsum | 10 to 30 parts |
| Sodium Hydroxide | 1 to 3 parts |
| Sodium Silicate Solution (saturated) | 150 to 275 parts |
| Particles of a metal or metals selected from the group consisting of aluminum and zinc | ¼ to 1½ parts |
| An Acidic Ingredient | 2 to 5 parts | shaping the composition to a desired configuration; and
drying the composition to a hardened porous condition.

2. The method as recited in claim 1, in which said acidic ingredient is sodium thiosulfate.

3. The method as recited in claim 1, in which said metal particles are aluminum.

4. The method as recited in claim 1, in which said particles are zinc.

5. The method as recited in claim 2, in which said metal particles are aluminum.

6. A cement product formed by the method of claim 1.

7. A cement product formed by the method of claim 2.

8. A cement product formed by the method of claim 3.

9. A cement product formed by the method of claim 4.

10. A cement product formed by the method of claim 5.

11. A cement product containing Na$_2$O.Al$_2$O$_3$.SiO$_2$.

12. A cement product containing Na$_2$O.Al$_2$(ZnO)$_3$.SiO$_2$.

13. A cement composition consisting essentially of the following ingredients in about the proportions set forth below by weight:

| | |
|---|---|
| Portland Cement | 70 to 94 parts |
| Gypsum | 10 to 30 parts |
| Sodium Hydroxide | 1 to 3 parts |
| Sodium Silicate Solution (saturated) | 150 to 275 parts |
| Zinc and/or Aluminum Particles | ¼ to 1½ parts |
| Acidic Ingredient | 2 to 5 parts |

14. A composition as recited in claim 13, in which said acidic ingredient is sodium thiosulfate.

15. A composition as recited in claim 13, in which said acidic ingredient is sodium thiosulfate, and said metal particles are aluminum.

16. The method of producing a cement product that comprises:
forming a composition consisting essentially of the following ingredients in about the proportions set forth below, by weight, intermixed with water in an amount rendering the composition moldable:

| | |
|---|---|
| Portland Cement | 70 to 94 parts |
| Gypsum | 10 to 30 parts |
| Sodium Hydroxide | 1 to 3 parts |
| Sodium Silicate Solution (saturated) | 150 to 275 parts |
| Aluminum particles | ¼ to 1½ parts |
| Sodium Thiosulfate | 2 to 5 parts | reacting said ingredients chemically to produce Na$_2$O.Al$_2$O$_3$.SiO$_2$ in the composition;
shaping the composition to a desired configuration; and
drying the composition to a hardened porous condition.

17. A cement product formed by the method of claim 16.

18. The method of producing a cement product that comprises:
forming a composition consisting essentially of the following ingredients in about the proportions set forth below, by weight, intermixed with water in an amount rendering the composition moldable:

| | |
|---|---|
| Portland Cement | 70 to 94 parts |
| Gypsum | 10 to 30 parts |
| Sodium Hydroxide | 1 to 3 parts |
| Sodium Silicate Solution (saturated) | 150 to 275 parts |
| Zinc particles | ¼ to 1¼ parts |
| Sodium Thiosulfate | 2 to 5 parts | reacting said ingredients chemically to produce $Na_2O.Al_2(ZnO)_3.SiO_2$ in the composition;

shaping the composition to a desired configuration; and drying the composition to a hardened porous condition.

19. A cement product formed by the method of claim 18.

* * * * *